H. W. PLEISTER.
CONDUIT OR CABLE CLAMP AND BRIDLE RING.
APPLICATION FILED APR. 24, 1920.
1,365,621. Patented Jan. 11, 1921.
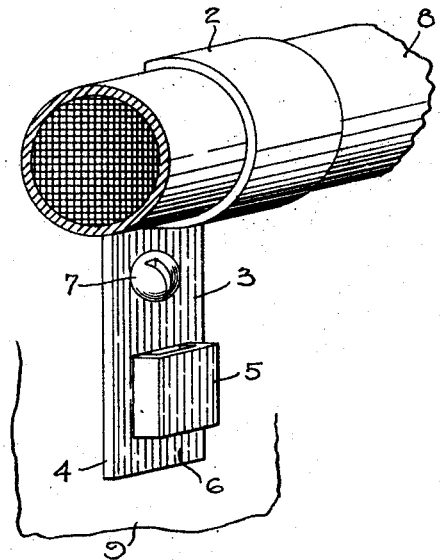
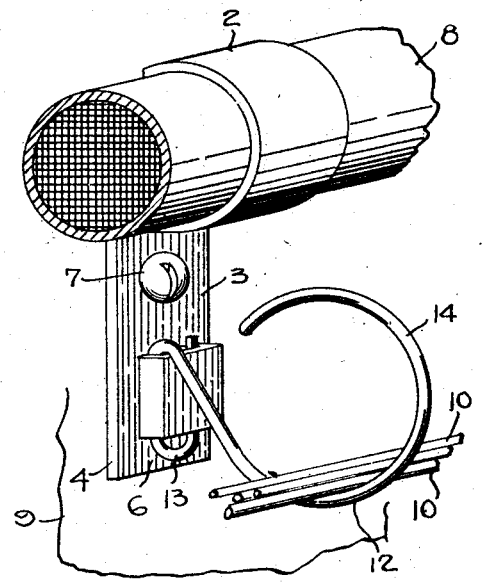
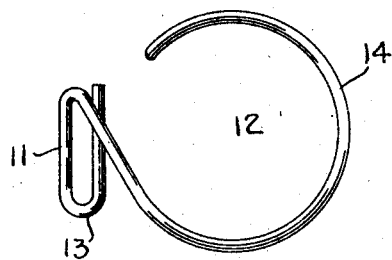
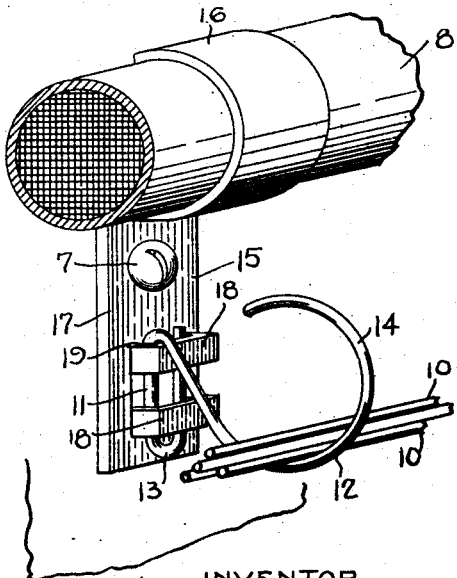
INVENTOR
Henry W. Pleister,
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,621.  Specification of Letters Patent.  Patented Jan. 11, 1921.

Original application filed January 23, 1920, Serial No. 353,624. Divided and this application filed April 24, 1920. Serial No. 376,273.

*To all whom it may concern:*

Be it known that I, HENRY W. PLEISTER, a citizen of the United States, residing in Westfield, in the county of Union and State of New Jersey, have invented certain new and useful Improvements in Conduit or Cable Clamps and Bridle-Rings, of which the following is a specification, taken in connection with the accompanying drawings.

This application is a division of my copending application Ser. No. 353,624, filed Jan. 23, 1920.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket, recess or boss to receive the shank of a wire bridle ring, which has preferably been properly bent on itself to form a U-shaped member. This member snugly fits the socket or recess and prevents rattling of the parts.

My invention further relates to a pigtail bridle ring formed of wire having one of its ends shaped to fit an angular socket or recess in the conduit or cable clamp.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures in which I have shown different embodiments of my invention, the same reference numerals refer to similar parts in the several figures.

Figure 1 is a perspective view of my conduit or cable clamp and a cable which it supports;

Fig. 2 is a perspective view similar to Fig. 1 but with the addition of a pigtail bridle ring;

Fig. 3 is a detail perspective view of the bridle ring shown in Fig. 2;

Fig. 4 is a perspective view of a modified form of conduit or cable clamp with my improved wire pigtail bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal. Near the bottom 4 of the base I form an integral socket or recess 5 running parallel to the longitudinal axis of the conduit or cable clamp 1. This socket, when the clamp is made of sheet metal, is preferably struck up in the form of an angular hollow box or boss. Preferably the portion 6 of the base is not bent and serves as a bearing or an abutment for the end of the bridle ring.

In use the screw 7 serves to hold the conduit or cable clamp with the cable 8 to the wall or other suitable support 9.

Should the capacity of the cable 8 prove insufficient, in the course of time, to carry the increased traffic, and it is not deemed economical or expedient to take down this cable and install a new one of greater capacity, the original installation can, at minimum expense, be greatly augmented by stringing runs of bridle wires 10, 10 to accommodate the increased traffic load.

By my invention the shank 11 of the bridle ring 12 is dropped into the socket or recess 5. When the parts are positioned as shown in Fig. 2, the end 13 of the shank 11 bears upon the portion 6 of the base 3. This gives a firm support for the pigtail bridle ring 12.

This wire bridle ring is preferably formed by bending one end back on itself to form the U-shaped shank 11. The other end is bent to form the open ring 14. This U-shaped member preferably fits with a slight spring friction within the socket 5.

In some cases I may form my conduit or cable clamp 15 with a hook portion 16 and a base 17. This base is provided with a plurality of straps 18, 18, preferably struck up from the base when the latter is formed of sheet material. These straps form an open pocket, box or boss 19, angular in cross section, which coöperates with the U-shaped shank 11 of the wire bridle ring 12.

It will be noted that in my improved construction it is not necessary to tap or screwthread the conduit or cable clamp; nor is it necessary to place screwthreads upon my bridle ring. This of course saves considerable expense in the manufacture of the article and reduces the amount of metal necessary to make the conduit or cable clamp.

Having thus described this invention in connection with an illustrative embodiment thereof, to the details of which I do not desire to be limited, what is claimed as new and what is desired to secure by Letters Patent is set forth in the appended claims.

What I claim is:—

1. The combination of a conduit or cable clamp having a hook portion to support a conduit or cable and a base to lie against a wall or other suitable support, the base being provided with a longitudinally extending boss or box formed by striking up a part of the base, said boss or box being rectangular in cross section, and a wire bridle ring having one end bent back to form a U-shaped shank adapted to be yieldingly pressed into said rectangular boss or box and be securely held therein without rattling.

2. The combination of a conduit or cable clamp having a base, a hook, and a hollow open boss or box formed by raising a plurality of straps above the base, and a wire bridle ring coöperating with the hollow boss or box.

3. The combination of a conduit or cable clamp formed from sheet material having a hook and a base, and a plurality of straps struck up from the base to form an open boss or box, and a wire pigtail bridle ring having one end bent back on itself to form a spring U-shaped shank to fit in said hollow boss or box formed by said straps.

HENRY W. PLEISTER.

Witnesses:
 MARY R. RYAN,
 A. M. WILLIAMS.